US012683472B2

(12) United States Patent (10) Patent No.: US 12,683,472 B2
Manuelli et al. (45) Date of Patent: Jul. 14, 2026

(54) TWISTING ASSEMBLY FOR WIRES OF INDUCTIVE WINDINGS AND THE LIKE

(71) Applicant: ATOP S.P.A., Barberino (IT)

(72) Inventors: Giovanni Manuelli, Bagno a Ripoli (IT); Filippo Profeti, Poggibonsi (IT)

(73) Assignee: ATOP S.P.A., Barberino (IT)

( * ) Notice: Subject to any disclaimer, the term of this patent is extended or adjusted under 35 U.S.C. 154(b) by 188 days.

(21) Appl. No.: 18/698,484

(22) PCT Filed: Sep. 27, 2022

(86) PCT No.: PCT/EP2022/076859
§ 371 (c)(1),
(2) Date: Apr. 4, 2024

(87) PCT Pub. No.: WO2023/061749
PCT Pub. Date: Apr. 20, 2023

(65) Prior Publication Data
US 2024/0421677 A1 Dec. 19, 2024

(30) Foreign Application Priority Data
Oct. 14, 2021 (IT) ........................ 102021000026312

(51) Int. Cl.
*H02K 15/04* (2025.01)
*H02K 15/0428* (2025.01)
*H02K 15/064* (2025.01)
(52) U.S. Cl.
CPC ....... *H02K 15/0428* (2013.01); *H02K 15/064* (2013.01)

(58) Field of Classification Search
CPC ........................ H02K 15/0428; H02K 15/064
See application file for complete search history.

(56) References Cited

U.S. PATENT DOCUMENTS 7,530,157 B2 * 5/2009 Sawada .............. H02K 15/0428
29/605

OTHER PUBLICATIONS

Italian Search Report for Italian Application No. 202100026312 completed on May 23, 2022.
International Search Report and Written Opinion for International Application No. PCT/EP2022/076859 completed on Nov. 18, 2022.

* cited by examiner

*Primary Examiner* — Sean Gugger
(74) *Attorney, Agent, or Firm* — Carlson, Gaskey & Olds, P.C.

(57) ABSTRACT

A twisting assembly for wires of inductive windings that comprises a fixed frame. The assembly comprises: at least two bushings provided with respective channels and each of which defines at least one seat for at least one respective wire; at least one upper shaped portion which is provided, on at least one upper surface of at least one bushing, with a conveyance chute for the terminal front of at least one wire; at least one element for moving the at least two bushings for the rotation of at least one first bushing with respect to at least one second bushing for the temporary alignment of at least one upper shaped portion of at least one first bushing with at least one channel of at least one second bushing which is open toward the first bushing.

14 Claims, 16 Drawing Sheets

TWISTING ASSEMBLY FOR WIRES OF INDUCTIVE WINDINGS AND THE LIKE

The present invention relates to a twisting assembly for wires of inductive windings.

Electric motors, dynamos, alternators and transformers comprise a core of ferromagnetic material on which windings are arranged which are made with electrical wires arranged according to a specific geometry. The circulation of a current in at least one of the windings determines, by electromagnetic induction, the circulation of an induced current in at least one other winding. Furthermore, forces between the windings and the respective ferromagnetic cores act on each other and are capable, for example, of turning the rotor with respect to the stator in an electric motor.

Inductive windings are made with elements made of electrically conducting material (generally copper) which are covered with a layer of dielectric material (not electrically conducting), for their insulation. For specific applications, providing the windings is done using pieces (of any shape) of electrically conducting material coupled to each other at at least one end, which are inserted into the specific recesses present in the ferromagnetic cores of the machine under construction. These pieces are known as "hairpins" in the trade and they require, before their insertion into the respective recesses, preparatory operations for spatial orientation according to the desired winding logic. In particular, a first end of each piece is designed to be inserted into a respective first recess, while a second end of the piece needs to be inserted into a second recess, according to the desired logic for the winding being provided.

In order to accelerate the procedure of providing the windings, the possibility is known of shaping the wires, which constitute the various windings, before their insertion into the respective recesses of the ferromagnetic cores for which they are provided, so that they already assume the desired shape and arrangement.

This procedure requires the intervention of operators, who manually perform some positionings and who shape and orient the wires in the most appropriate manner. Obviously, this results in very high costs and implies a high risk of inaccuracies and human errors in the arrangement and shaping of the wires.

The aim of the present invention is to solve the above-mentioned drawbacks, by providing a twisting assembly for wires of inductive windings that enables the rapid advance preparation of at least some of an inductive winding.

Within this aim, an object of the invention is to provide a twisting assembly for wires of inductive windings of the completely automatic type.

Another object of the invention is to provide a twisting assembly for wires of inductive windings that does not subject the wires to excessive mechanical stresses.

Another object of the invention is to provide a twisting assembly for wires of inductive windings that is particularly precise and assured.

Another object of the invention is to provide a twisting assembly for wires of inductive windings that ensures the maximum consistency of the twisting performed, in geometric and also aesthetic terms.

Another object of the present invention is to provide a twisting assembly for wires of inductive windings that is low cost, easily and practically implemented and safe in use.

This aim and these objects are achieved by a twisting assembly for wires of inductive windings of the type comprising a fixed frame on which a carousel provided with at least one pair of seats for respective wires of different lengths can rotate, as defined in claim 1

The above aim and objects are also achieved by a method for twisting wires of inductive windings as defined in claim 10

Further characteristics and advantages of the invention will become better apparent from the detailed description that follows of a preferred, but not exclusive, embodiment of the twisting assembly for wires of inductive windings, which is illustrated by way of non-limiting example in the accompanying drawings wherein:

FIG. 3 is a cross-sectional view taken along the line III-III traced in

Figure 1:
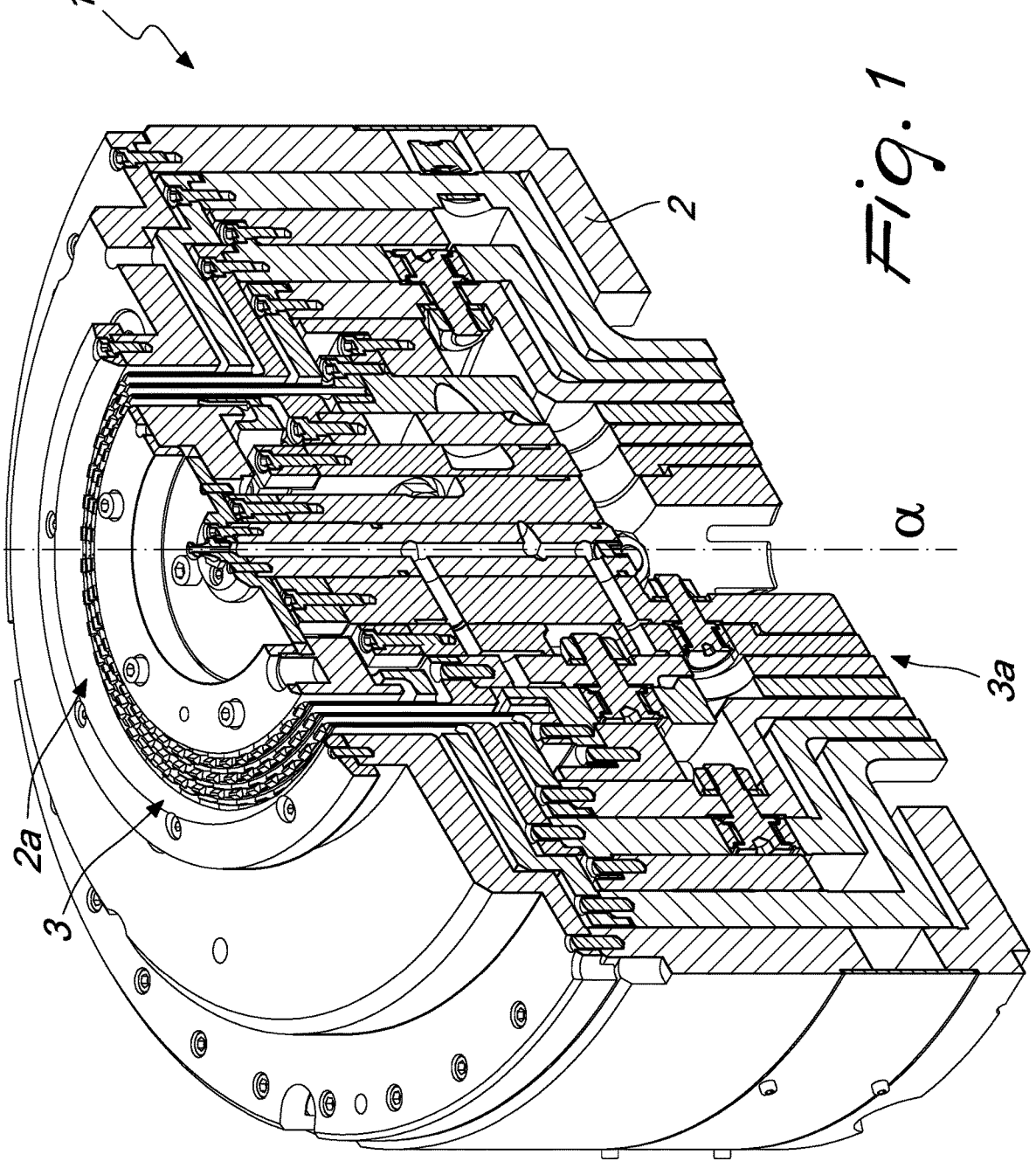
FIG. 1 is a schematic perspective view in cross-section, taken along a transverse plane, of a possible embodiment of a twisting assembly for wires of inductive windings according to the invention.
Figure 4:
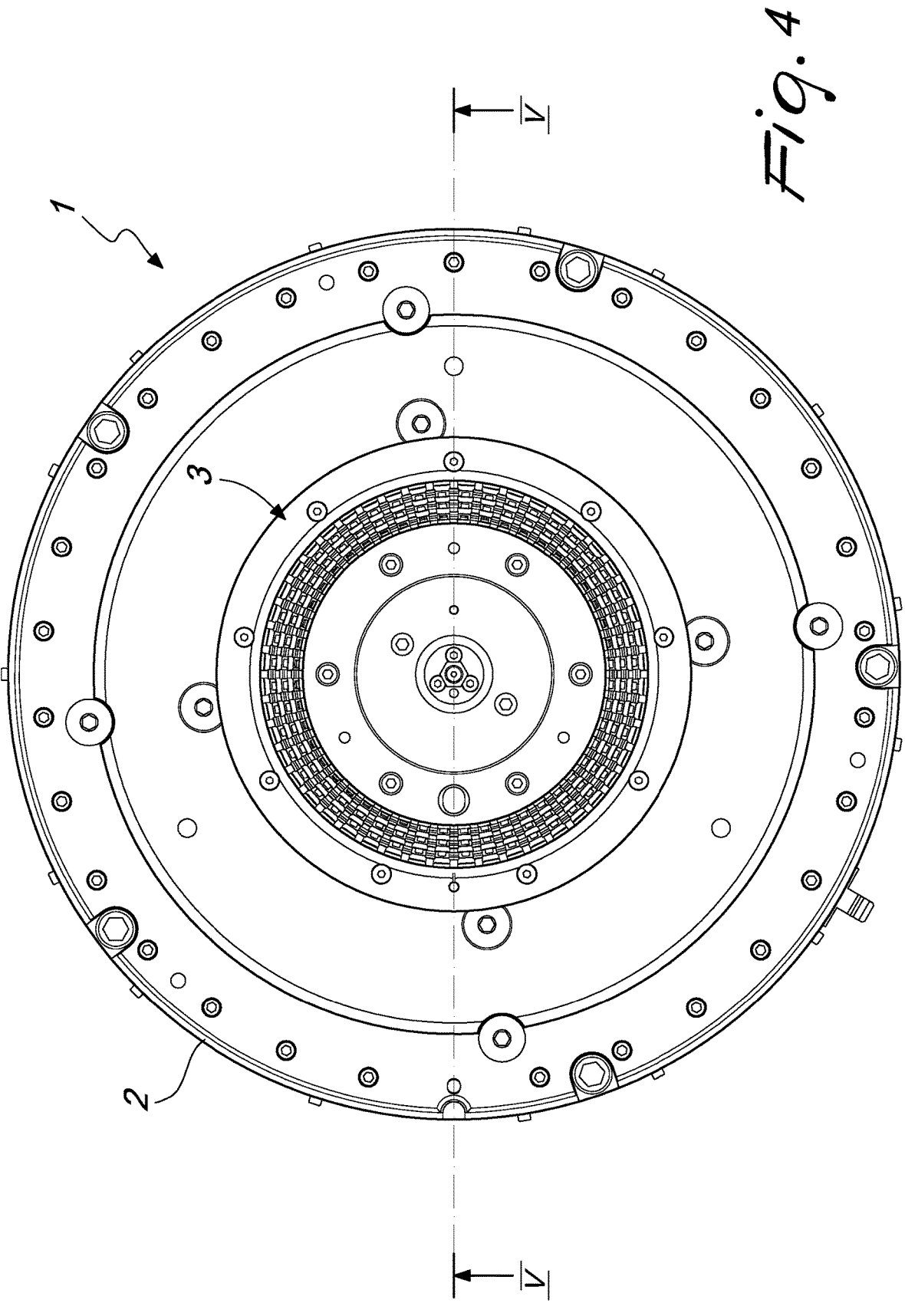
Figure 5:
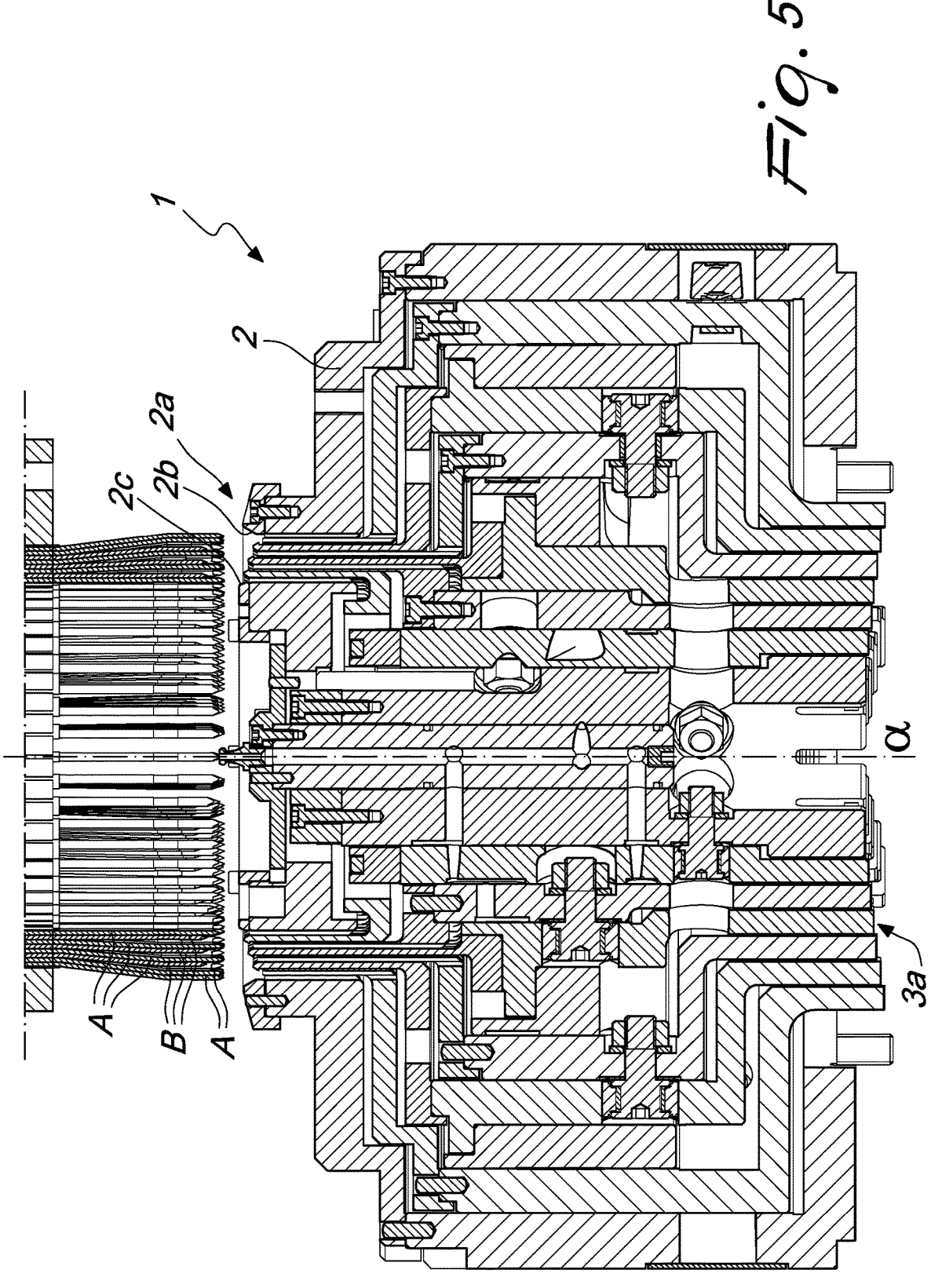
Figure 6:
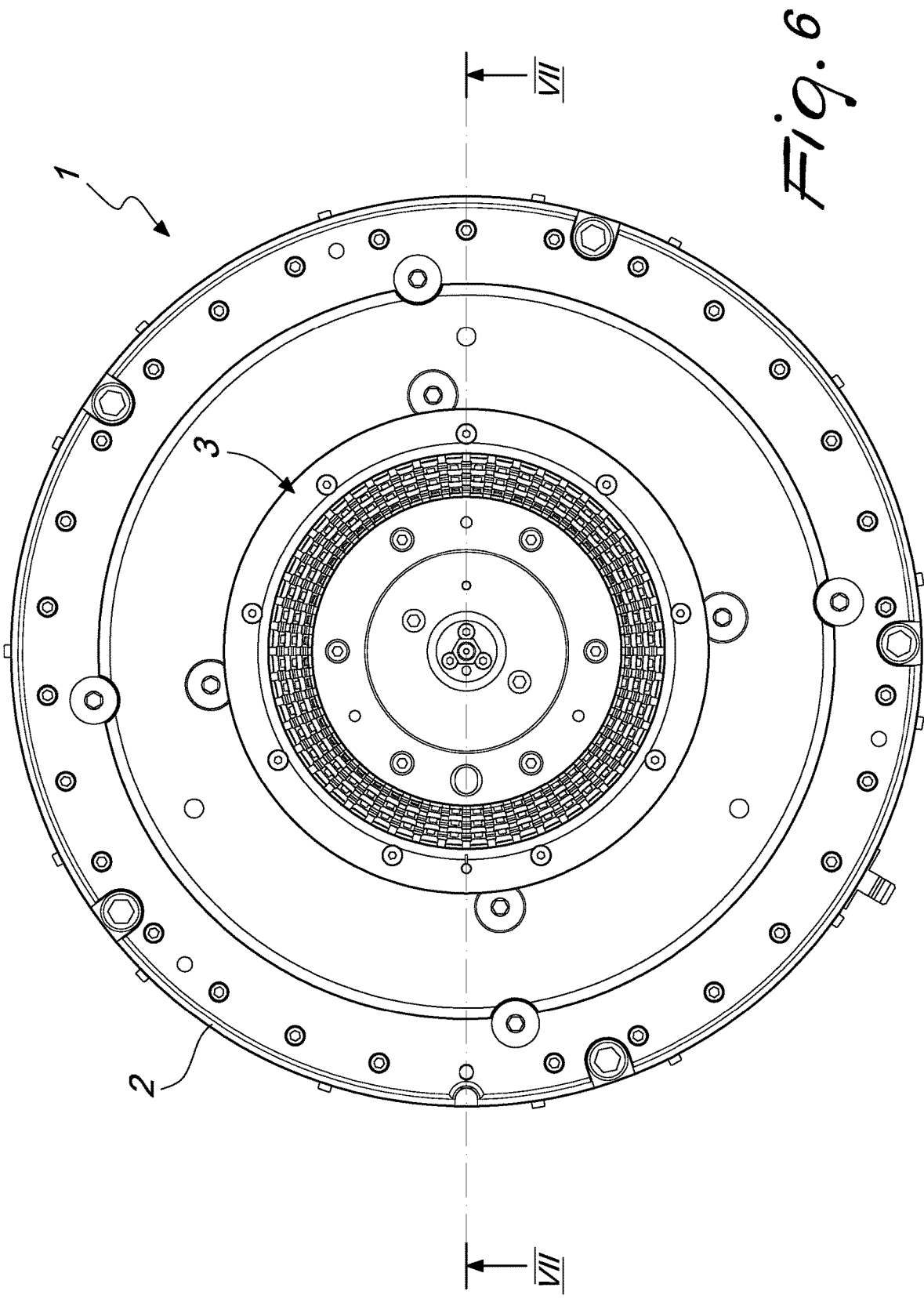
Figure 7:
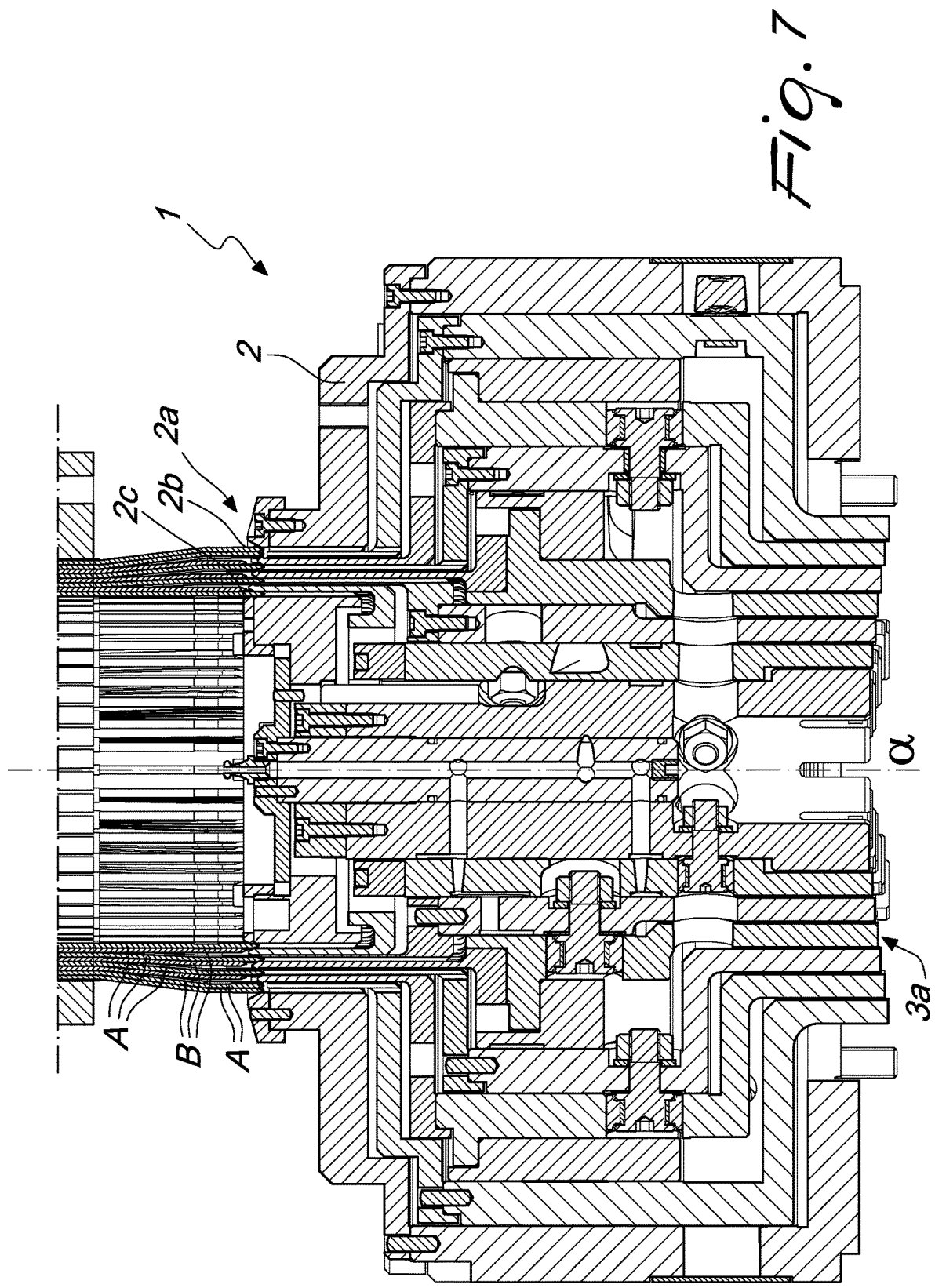
Figure 8:
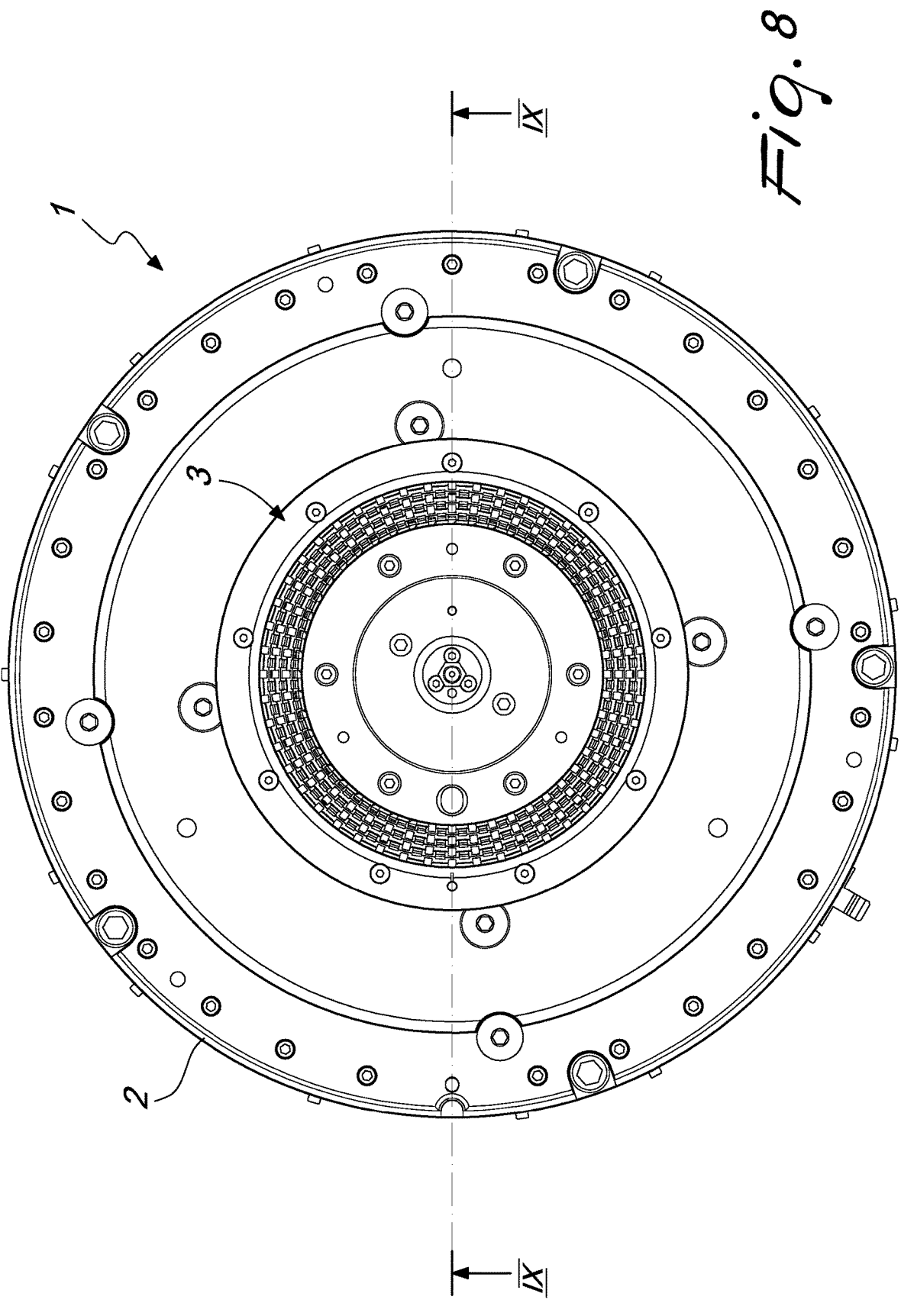
Figure 9:
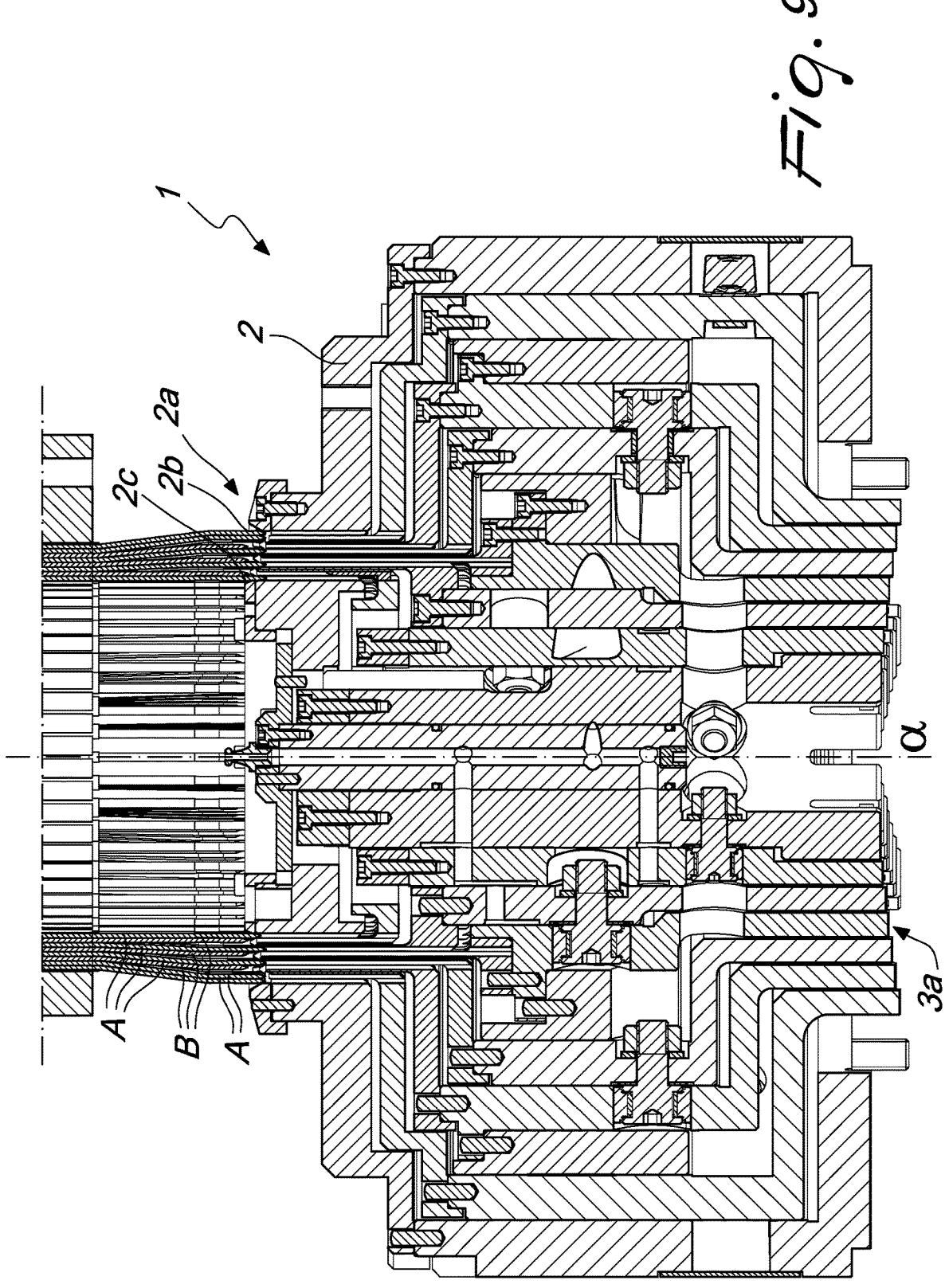
Figure 10:
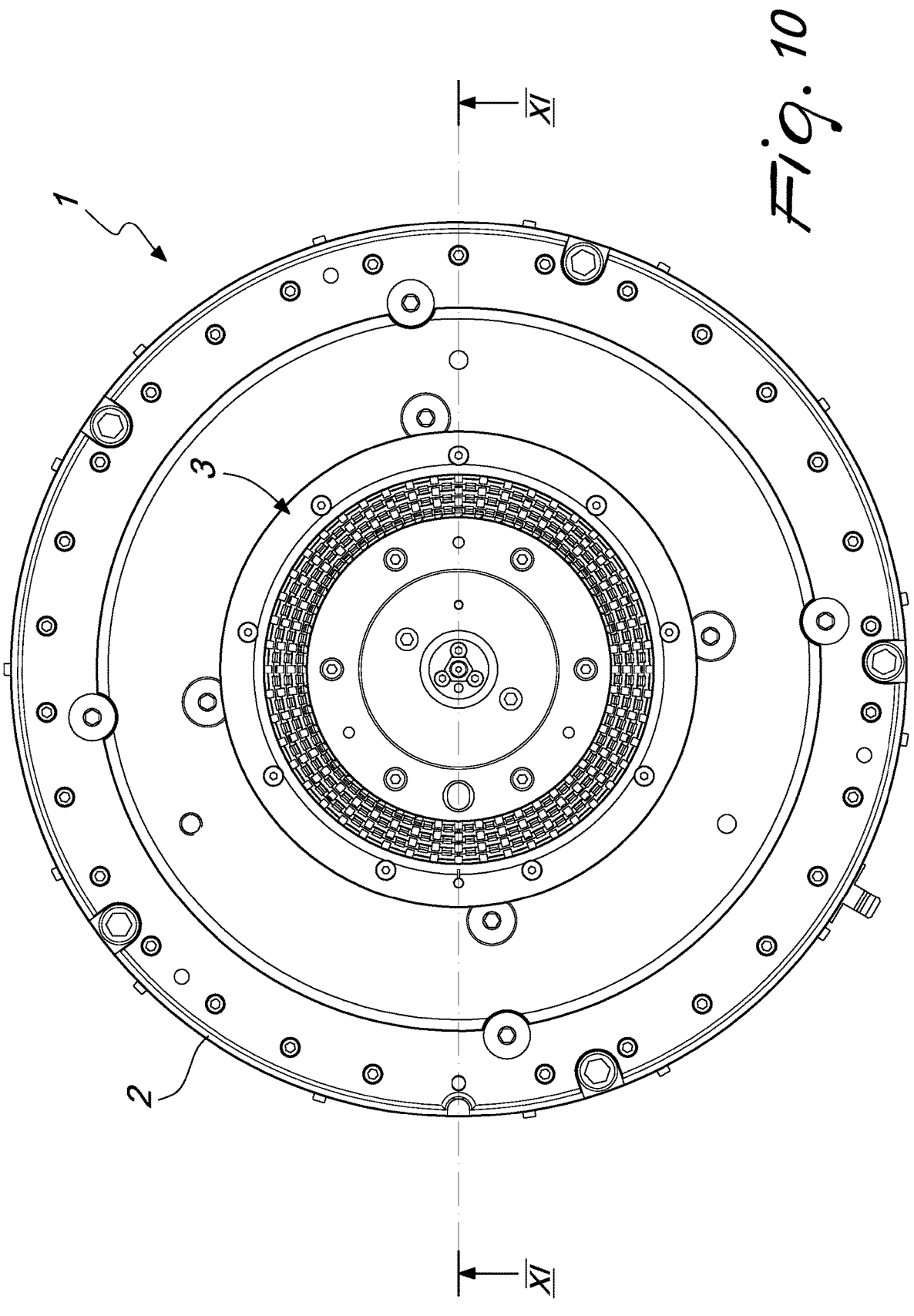
Figure 11:
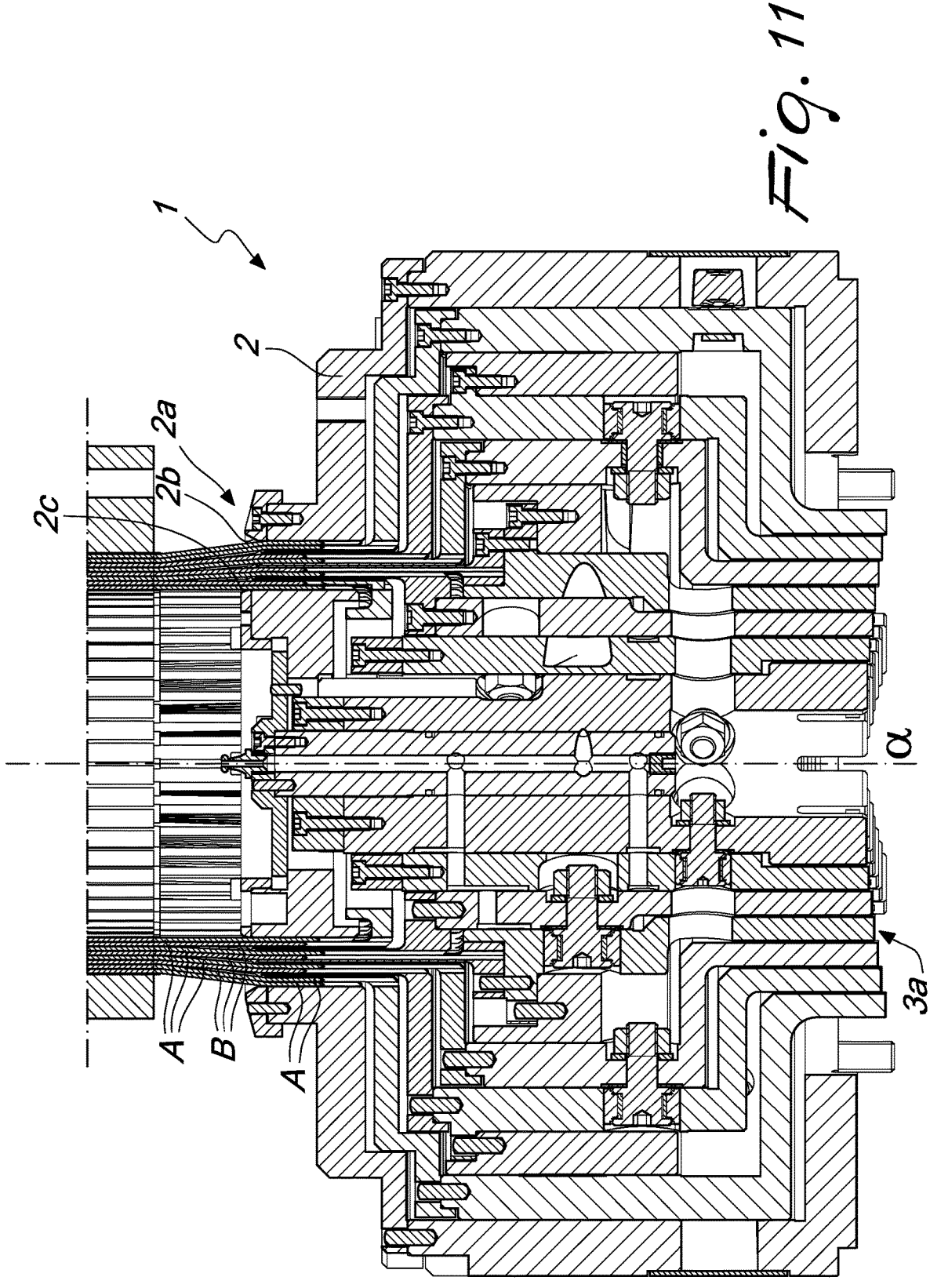
Figure 12:
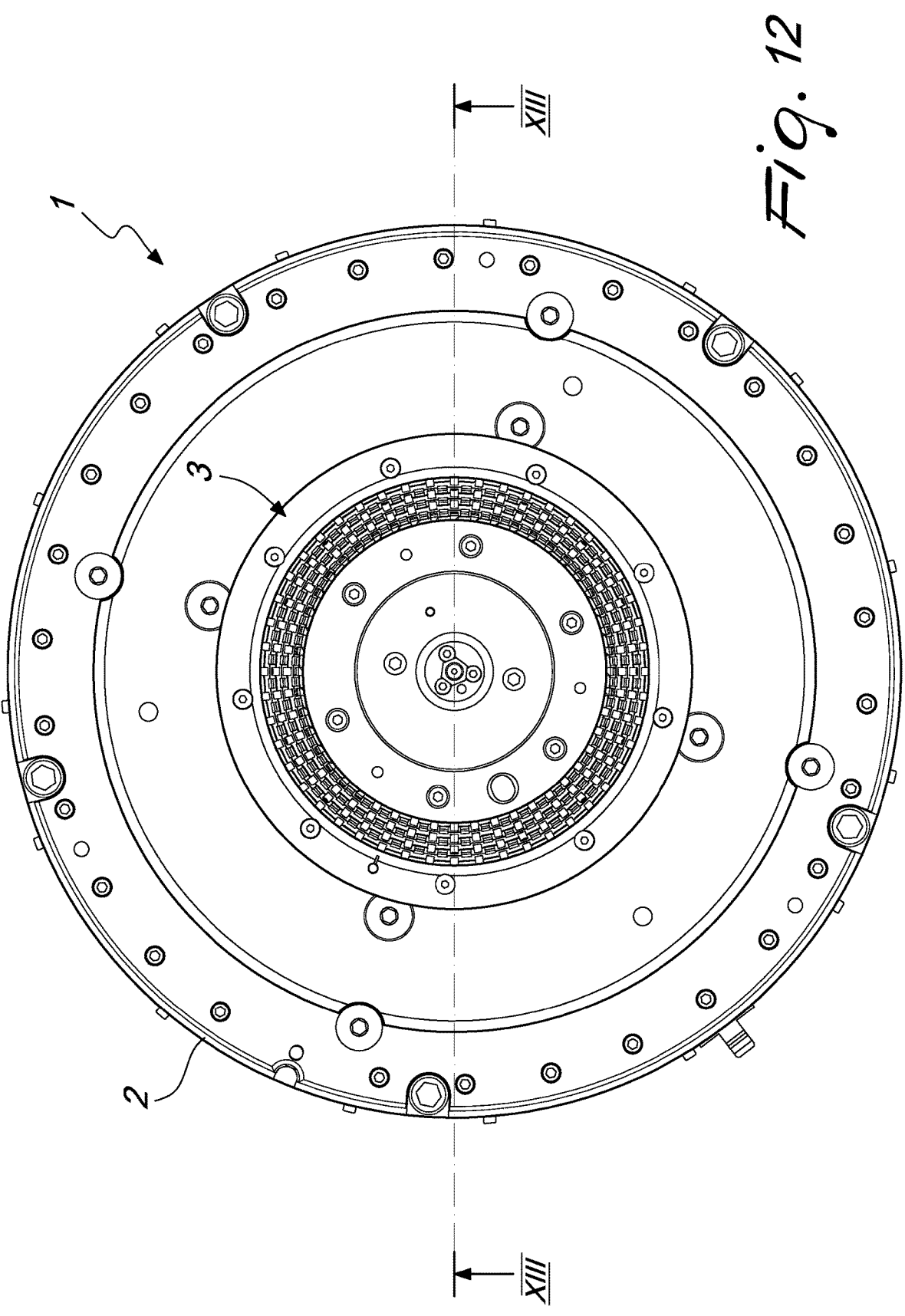
Figure 13:
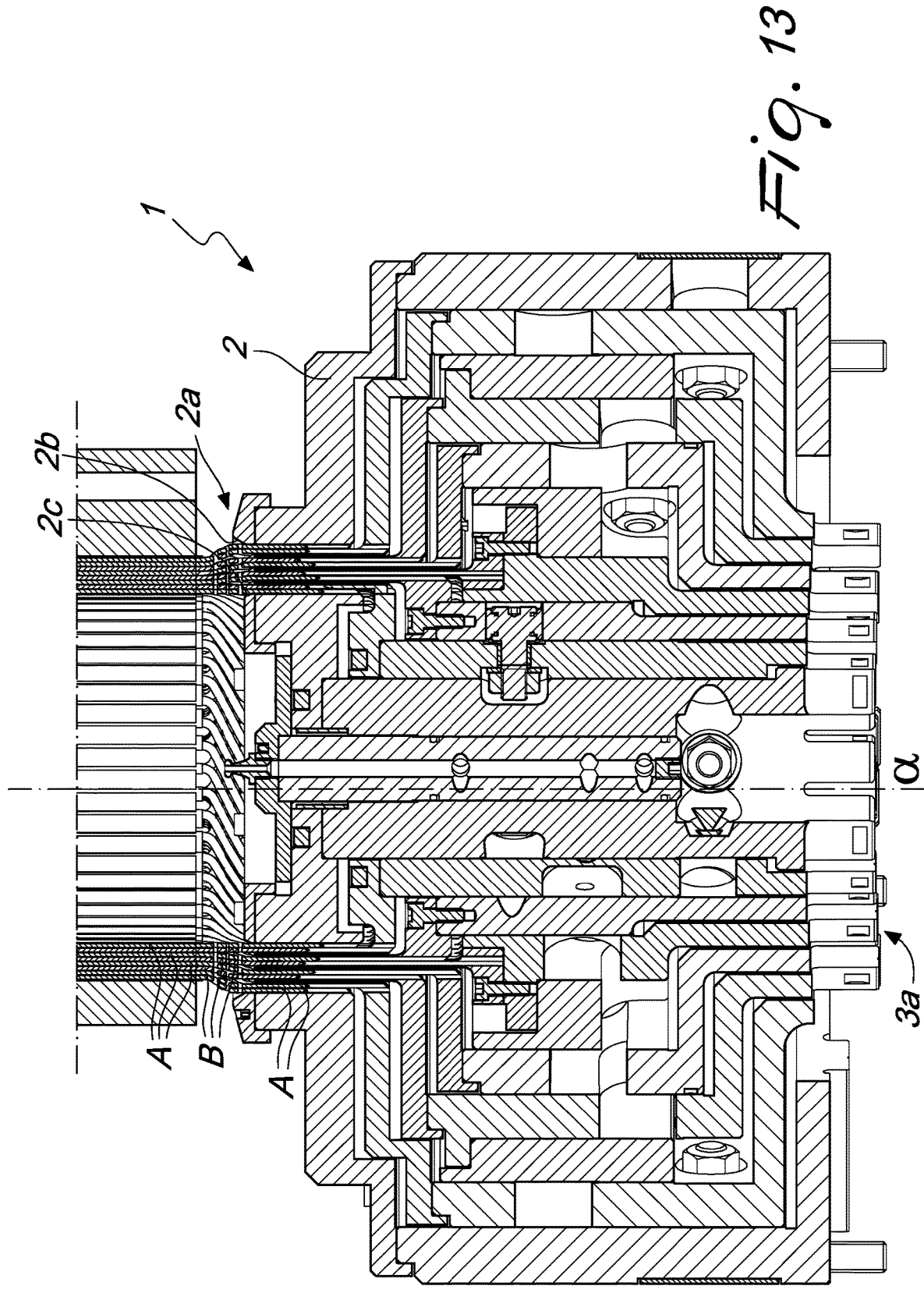
Figure 14:
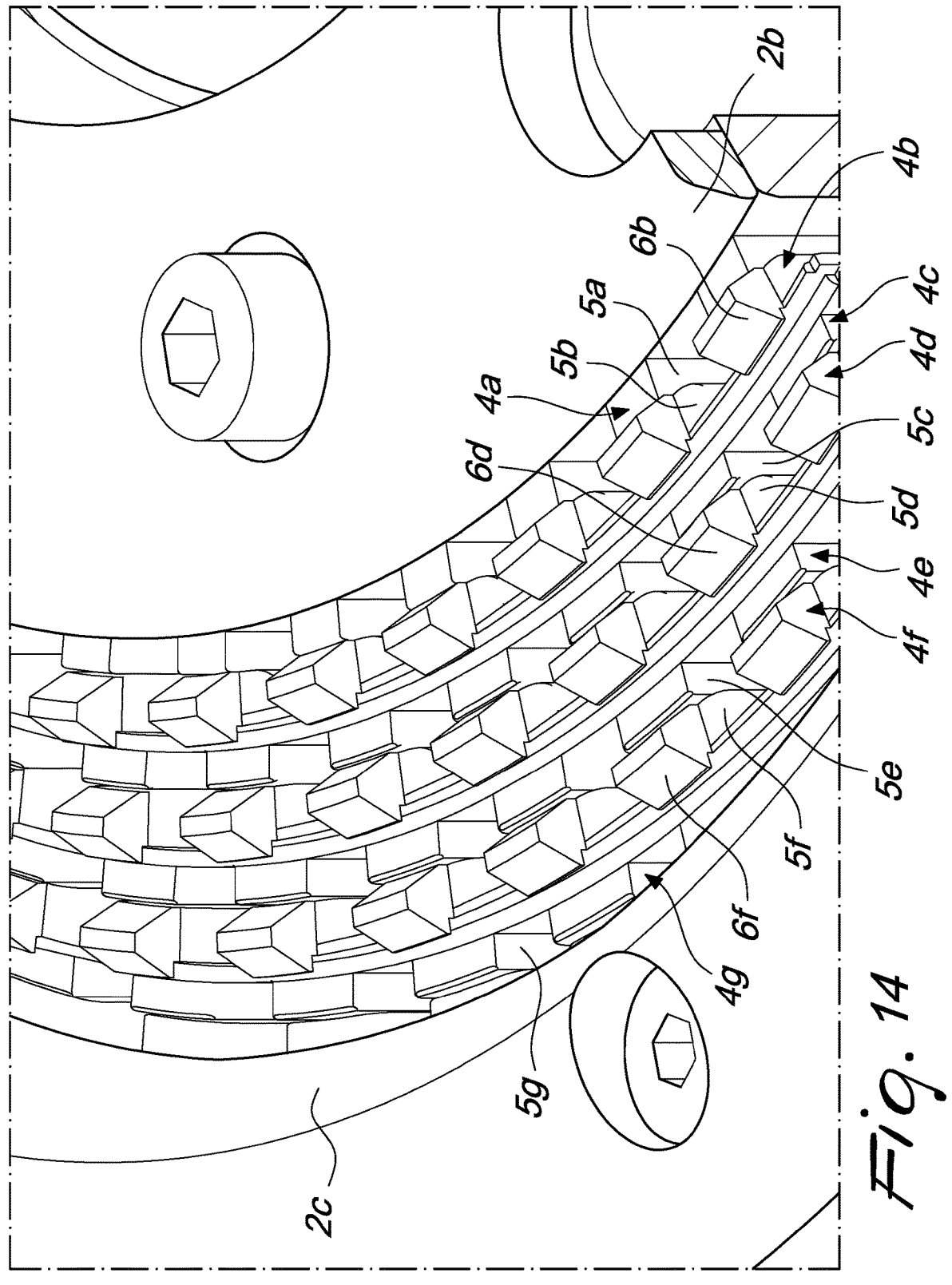
Figure 15:
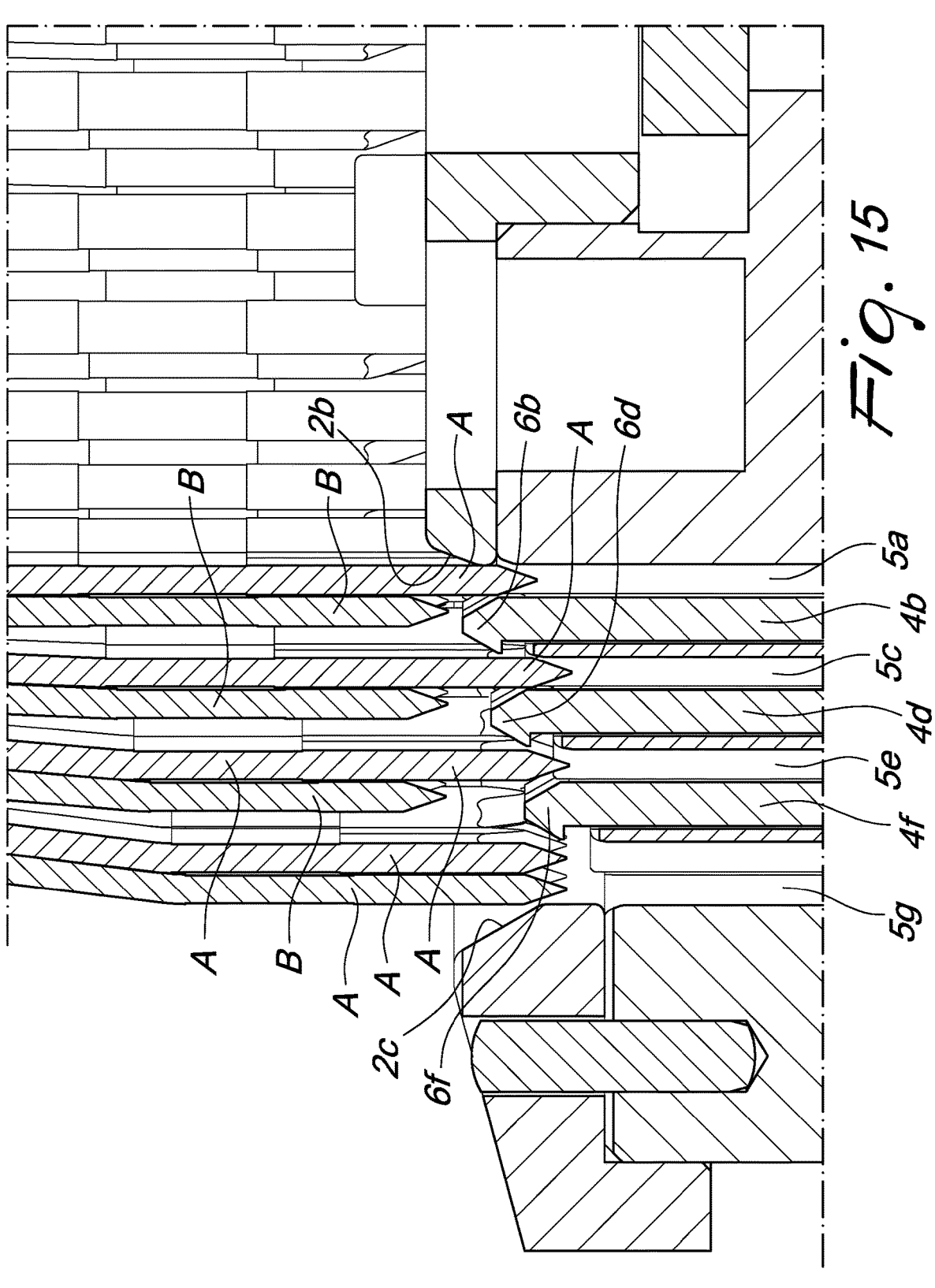
Figure 16:
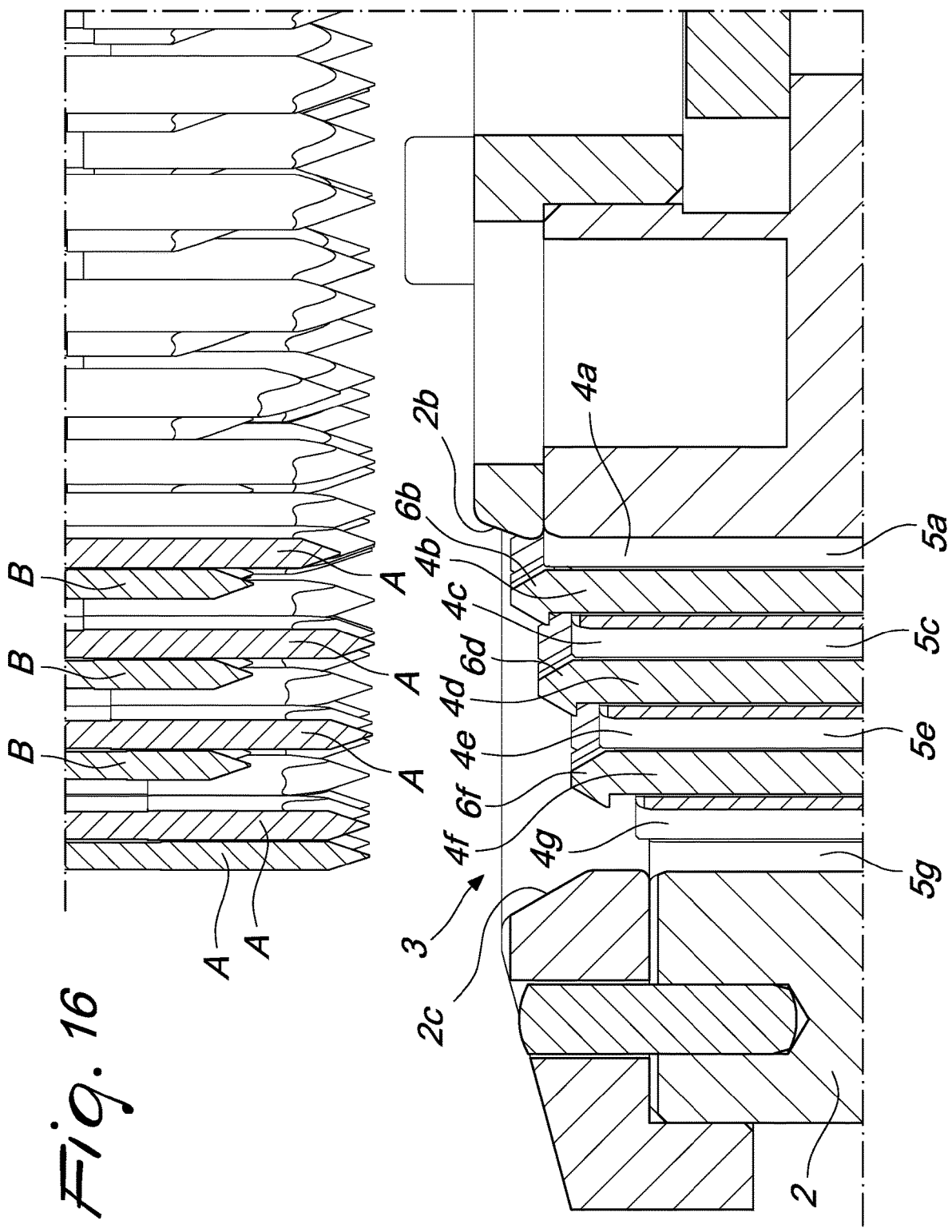

FIG. 2;

FIG. 4 is a schematic view from above of the assembly of FIG. 1 in a second configuration;

FIG. 5 is a cross-sectional view taken along the line V-V traced in FIG. 4;

FIG. 6 is a schematic view from above of the assembly of FIG. 1 in a third configuration;

FIG. 7 is a cross-sectional view taken along the line VII-VII traced in FIG. 6;

FIG. 8 is a schematic view from above of the assembly of FIG. 1 in a fourth configuration;

FIG. 9 is a cross-sectional view taken along the line IX-IX traced in FIG. 8;

FIG. 10 is a schematic view from above of the assembly of FIG. 1 in a fifth configuration;

FIG. 11 is a cross-sectional view taken along the line XI-XI traced in FIG. 10;

FIG. 12 is a schematic view from above of the assembly of FIG. 1 in a sixth configuration;

FIG. 13 is a cross-sectional view taken along the line XIII-XIII traced in FIG. 12;

FIG. 14 is an enlarged view of a detail of FIG. 1;

FIG. 15 is an enlarged view of a detail of FIG. 7;

FIG. 16 is an enlarged view of a detail of FIG. 5.

With particular reference to the figures, the reference numeral 1 generally designates a twisting assembly for wires A, B of inductive windings.

In the present description, the term "inductive windings" includes the windings of electric machines (for example the stator or rotor winding of an electric motor or the windings of a transformer) or other electrical windings designed to establish an inductive coupling with other windings or other components.

The twisting assembly 1 comprises a fixed frame 2 on which a carousel 3 provided with at least one pair of seats for respective wires A, B can rotate.

According to the invention the twisting assembly 1 comprises at least two bushings 4a, 4b, 4c, 4d, 4e, 4f, 4g, which are circular in cross-section and are mutually concentric.

Each one of such bushings 4a, 4b, 4c, 4d, 4e, 4f, 4g is provided with respective channels 5a, 5b, 5c, 5d, 5e, 5f, 5g which are substantially parallel to the axis of symmetry a and each of which defines at least one seat for at least one respective wire A, B.

The channels 5a, 5b, 5c, 5d, 5e, 5f, 5g are shaped substantially like outwardly-open pockets defined on the cylindrical surface of the respective bushing 4a, 4b, 4c, 4d, 4e, 4f, 4g: in practice they are perimetric longitudinal grooves. When two channels 5a, 5b, 5c, 5d, 5e, 5f, 5g face each other, they delimit a receptacle that is adapted to accommodate two wires A, B that are laterally adjacent and proximate.

At least one of the cited bushings 4a, 4b, 4c, 4d, 4e, 4f, 4g comprises along its upper edge at least one upper shaped portion 6b, 6d, of which has, on at least one surface thereof, a conveyance chute for the terminal front of at least one wire A into a seat that is proximate thereto.

The at least one upper shaped portion 6 can be constituted by a localized projection (for example a tooth) or by a continuous ridge (with conveniently shaped surfaces) that is broken solely at the channels 5b, 5d, 5f of the respective bushing 4b, 4d, 4f.

In any case other, different embodiments are not ruled out.

According to the invention the assembly 1 will further comprise at least one element 3a for moving the at least two bushings 4a, 4b, 4c, 4d, 4e, 4f, 4g for the rotation of at least one first bushing 4b, 4d, 4f with respect to at least one second bushing 4a, 4c, 4e, 4g (the reference numerals to the components given in the accompanying figures represent one of the possible embodiments proposed by way of non-limiting example of the present invention).

It should be noted that the rotation of the at least one first bushing 4b, 4d, 4f with respect to at least one second bushing 4a, 4c, 4e, 4g will be adapted for the temporary alignment of at least one upper shaped portion 6b, 6d, 6f of at least one first bushing 4b, 4d, 4f with at least one channel 5a, 5c, 5e, 5g of at least one second bushing 4a, 4c, 4e, 4g (in particular the at least one channel 5a, 5c, 5e, 5g will have the respective opening directed toward the at least one first bushing 4b, 4d, 4f which has the upper shaped portion 6b, 6d, 6f).

It should be noted that, with particular reference to an embodiment of undoubted practical and applicative interest, the bushings 4a, 4b, 4c, 4d, 4e, 4f, 4g can advantageously be a plurality: each channel 5a, 5b, 5c, 5d, 5e, 5f, 5g of each bushing 4a, 4b, 4c, 4d, 4e, 4f, 4g will therefore be conveniently capable of being aligned with a corresponding channel 5a, 5b, 5c, 5d, 5e, 5f, 5g of every other bushing 4a, 4b, 4c, 4d, 4e, 4f, 4g along a radial direction. The channels 5a, 5b, 5c, 5d, 5e, 5f, 5g, when they are aligned in pairs, will have the openings facing each other and proximate, thus defining a receptacle adapted to accommodate at least a wire A and a wire B.

It should furthermore be noted that each channel 5a, 5b, 5c, 5d, 5e, 5f, 5g of each bushing 4a, 4b, 4c, 4d, 4e, 4f, 4g can profitably comprise an end inlet with flared edges in order to facilitate the ingress of the terminal front of at least one wire A, B: the presence of flaring of the front end of each channel 5a, 5b, 5c, 5d, 5e, 5f, 5g ensures that the terminal front of the wire A, B, when it comes into contact with such inclined surface, is conveyed toward the inside of the channel 5a, 5b, 5c, 5d, 5e, 5f, 5g, thus compensating for any problems resulting from misalignments and/or dimensional irregularities.

The term "flaring" should be understood to include bevels, connections and, in general, all inclined surfaces that are designed to connect the upper edge of the bushing 4a, 4b, 4c, 4d, 4e, 4f, 4g with the walls of the respective channel 5a, 5b, 5c, 5d, 5e, 5f, 5g.

It should be noted that the element 3a for the movement of the bushings 4a, 4b, 4c, 4d, 4e, 4f, 4g is of the combined rotary and translational type and therefore also permits the movement of such bushings 4a, 4b, 4c, 4d, 4e, 4f, 4g between an inactive configuration in which at least one bushing 4b, 4d, 4f, arranged externally in a radial direction, is located at a different height with respect to the at least one bushing 4a, 4c, 4e that is arranged inside it, and a configuration of full twisting of wires A, B accommodated in the channels 5a, 5b, 5c, 5d, 5e, 5f, 5g in which the bushings 4a, 4b, 4c, 4d, 4e, 4f, 4g are substantially arranged all at a same height, being substantially coplanar, for the arrangement of the wires A, B according to the geometry of the desired inductive winding.

By virtue of the specific inactive configuration, which entails different heights of the bushings 4a, 4b, 4c, 4d, 4e, 4f, 4g, the operations to insert (substantially straight) wires A, B into the channels 5a, 5b, 5c, 5d, 5e, 5f, 5g until they are fully accommodated are made easier.

With particular reference to an embodiment of undoubted practical and applicative interest, the axial height of a first bushing 4a, 4c, 4e will advantageously be greater than that of a second bushing 4b, 4d, 4f that is contiguous to it and which has, with respect to such first bushing 4a, 4c, 4e, a greater diameter. This difference in height enables the non-simultaneous insertion of the wires A, B and therefore a simpler management of their insertion.

The configuration of full twisting of the wires A, B accommodated in the channels 5a, 5b, 5c, 5d, 5e, 5f, 5g will instead ensure that, since the bushings 4a, 4b, 4c, 4d, 4e, 4f, 4g will in this case be arranged at a same height, the wires A, B will be perfectly arranged according to the geometry of the provided inductive winding.

It should therefore be noted that, by virtue of the presence of the element 3a of the combined rotary and translational type for the movement of the bushings 4a, 4b, 4c, 4d, 4e, 4f, 4g, between each bushing 4a, 4b, 4c, 4d, 4e, 4f, 4g and fixed frame 2, guiding means 2a can usefully be interposed for that bushing 4a, 4b, 4c, 4d, 4e, 4f, 4g (in particular, the portion of fixed frame 2 with respect to the specific bushing 4a, 4b, 4c, 4d, 4e, 4f, 4g is guided in its motion).

Such guiding means 2a conveniently will define, for the bushing 4a, 4b, 4c, 4d, 4e, 4f, 4g, a degree of rotational freedom about its own axis of symmetry a and a degree of translational freedom along the direction of its own axis of symmetry a: such movements of rotation and translation (in height) will occur according to angular and linear travels of predefined extent (as a function of the specific reciprocal movements to be imparted to the various bushings 4a, 4b, 4c, 4d, 4e, 4f, 4g for the purpose of carrying out a twisting of the wires A, B corresponding to the geometric characteristics of the specific inductive winding that it is desired to provide).

In order to ensure an optimal operation of the assembly 1 according to the invention, the at least one upper shaped portion 6b, 6d, 6f can advantageously be shaped substantially like a wedge, comprising a pair of mutually opposite inclined faces, which substantially converge at the apex of the wedge. In this manner it can act as inclined guide plane for a wire A, B that needs to be routed into a channel 5a, 5c, 5e, 5g of a bushing 4a, 4c 4e, 4g that is contiguous with the one that comprises this upper shaped portion 6b, 6d, 6f (arranged inside or outside the bushing 4b, 4d, 4f that comprises the upper shaped portion 6b, 6d, 6f).

It should be noted that, in such case, each inclined face of the wedge that constitutes the upper shaped portion 6b, 6d, 6f will profitably define a conveyance chute for the terminal front of at least one such wire A, B into a seat of a contiguous bushing 4a, 4c, 4e, 4g (which has the respective opening directed toward that inclined face).

The assembly 1 according to the invention further comprises an internal flared surface 2b which contiguously faces the innermost first bushing 4a and an external flared surface 2c which contiguously faces the outermost first bushing 4g, each flared surface 2b, 2c being configured to route a terminal end of at least one wire A, B into the first channels 5a, 5g of the bushings 4a, 4g.

Such flared surfaces 2b, 2c are fixed to the fixed frame 2.

The present invention also aims to protect a method for twisting wires A, B of inductive windings by means of a twisting assembly 1 of the type described up to this point.

Figure 2:
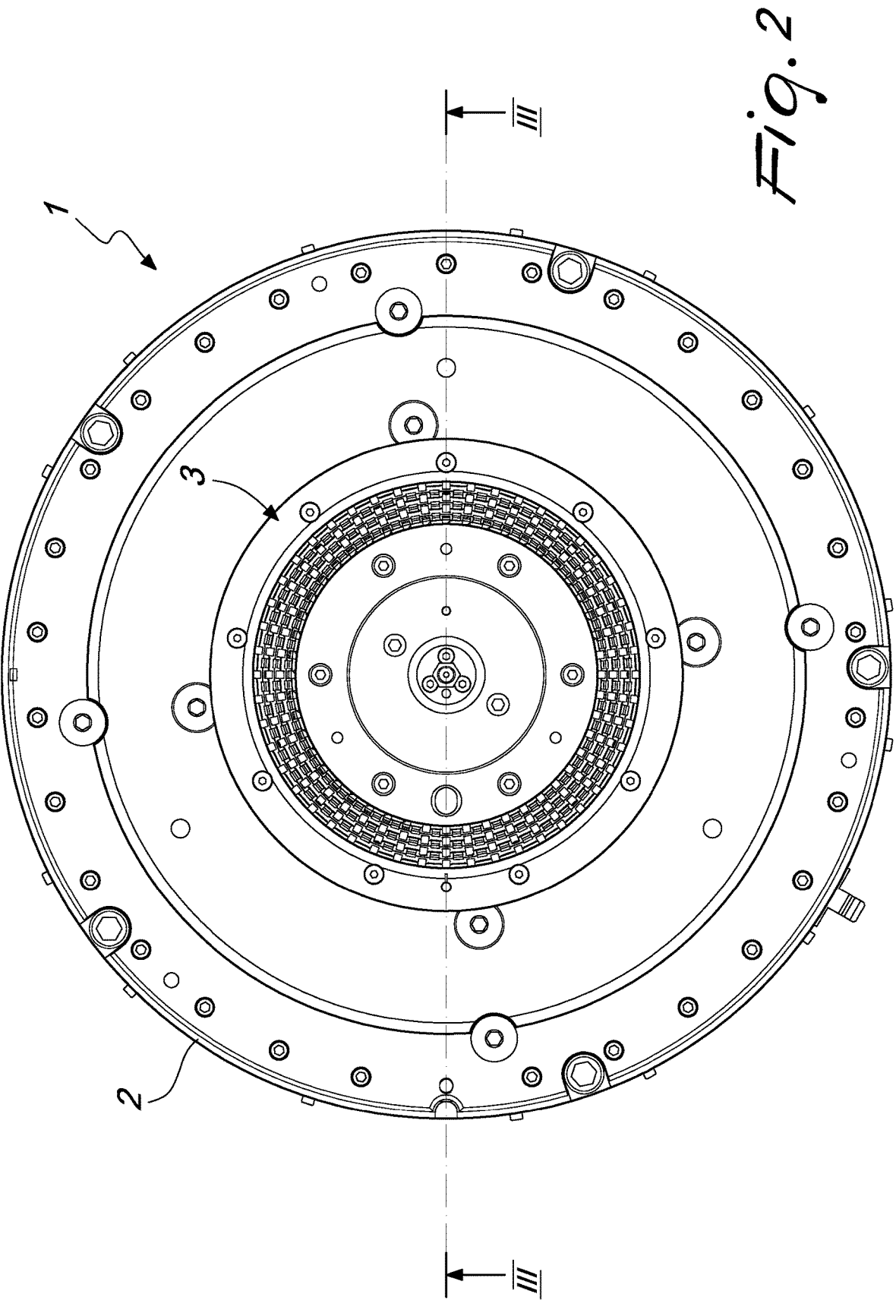
FIG. 2 is a schematic view from above of the assembly of FIG. 1 in a first configuration.
Figure 3:
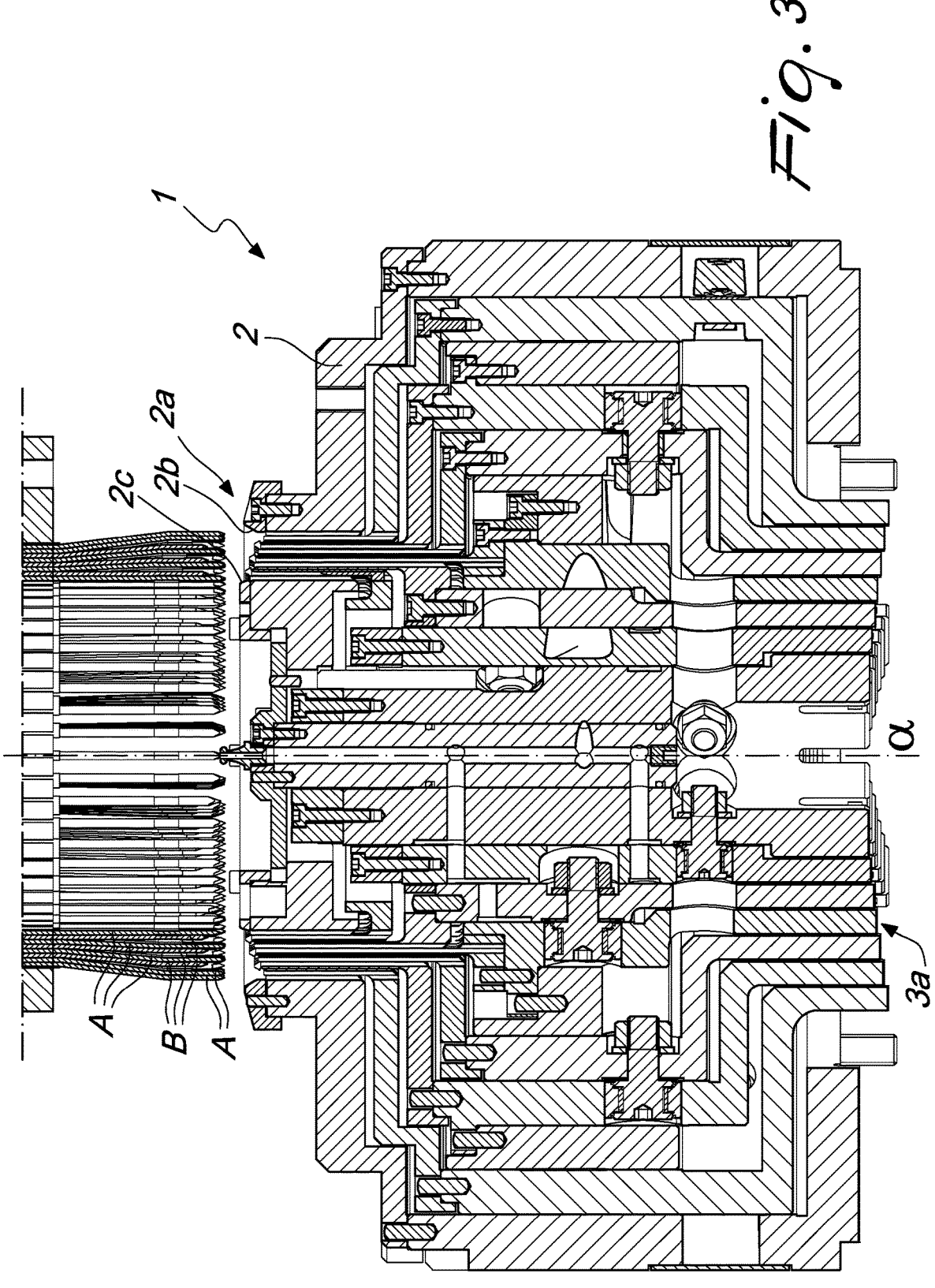

Such method entails a first step during which it will be necessary to prepare the wires A, B in pairs, according to the predefined geometric criteria of the inductive winding to be provided, keeping, in each pair, one wire A protruding more than the other B. This first step is defined purely by way of example by the accompanying FIGS. 2 and 3.

Subsequently, during a second step, it will be necessary to subject at least one first bushing 4b, 4d, 4f of the assembly 1 to a first rotation, thus obtaining the alignment of at least one upper shaped portion 6b, 6d, 6f thereof with at least one channel 5a, 5c, 5e, 5g of an additional second bushing 4a, 4c, 4e, 4g which is contiguous thereto. This second step is defined purely by way of example by the accompanying FIGS. 4 and 5.

Then (during a third step) each pair of wires A, B can be moved closer to the top of the assembly 1, until the terminal end of the most protruding wire A is inserted into a respective channel 5a, 5c, 5e, 5g of such additional second bushing 4a, 4c, 4e, 4g: during the insertion, the end of the wire A will be guided by the upper shaped portion 6b, 6d, 6f of the at least one first bushing 4b, 4d, 4f. This third step is defined purely by way of example by the accompanying FIGS. 6, 7 and 15.

The method then entails a fourth step in which the at least one first bushing 4b, 4d, 4f of the assembly 1 is subjected to a second rotation (which may also optionally be retrograde), thus obtaining the alignment of the respective channel 5b, 5d, 5f with that of the additional second bushing 4a, 4c, 4e, 4g which contains the terminal end of the most protruding wire A. This fourth step is defined purely by way of example by the accompanying FIGS. 8 and 9.

The fifth step of the method entails moving each pair of wires A, B closer again to the top of the assembly 1 until the terminal end of the shorter wire B is inserted into the channel 5b, 5d, 5f of the first bushing 4b, 4d, 4f that is contiguous to that of the additional second bushing 4a, 4c, 4e, 4g that already contains the terminal end of the most protruding wire A. This fifth step is defined purely by way of example by the accompanying FIGS. 10 and 11.

The insertion of the wires A, B into the channels 5a, 5b, 5c, 5d, 5e, 5f, 5g can then hen be completed (in a seventh step).

The seventh and final step of the method entails subjecting at least one of the bushings 4a, 4b, 4c, 4d, 4e, 4f, 4g to rotation for the twisting of at least one of the wires A, B according to the pattern specified for the inductive winding to be provided. This seventh_step is defined purely by way of example by the accompanying FIGS. 12 and 13.

It should be noted that the method according to the invention can also comprise a preliminary step of mutual alignment along a radial direction of all the channels 5a, 5b, 5c, 5d, 5e, 5f, 5g of the bushings 4a, 4b, 4c, 4d, 4e, 4f, 4g which define the seats for the wires A, B.

It should furthermore be noted that the first bushings 4b, 4d, 4f can advantageously be a plurality (for example 3 in the accompanying figures, although embodiments of the assembly with a different number of these components are not ruled out): each first bushing 4b, 4d, 4f will be contiguous with at least one respective second bushing 4a, 4c, 4e, 4g which is coaxial thereto and is arranged in a configuration chosen from internal and external.

The assembly 1 is particularly useful as it makes possible to provide (during the second step of the method) a configuration thereof in which the insertion of the terminal front of the (longer) conducting wires A inside the respective channel 5a, 5c, 5e, 5g of the bushing 4a, 4c, 4e, 4g that they face toward, is facilitated: in fact the arrangement of the upper shaped portion 6b, 6d, 6f of the at least one first bushing 4b, 4d, 4f that is aligned with the channels 5a, 5c, 5e, 5g of the bushings 4a, 4c, 4e, 4g that are contiguous therewith ensures that the terminal front of the wire A is guided toward the inlet of the respective channel 5a, 5c, 5e, 5g (the terminal front gains entry to the inlet by sliding on the inclined surfaces of the upper shaped portion 6b, 6d, 6f, as if it were an inclined plane). The flaring present at the inlet of each channel 5a, 5c, 5e, 5g will then ensure that the terminal front of the wire A will be correctly inserted inside it.

By executing the rotation (optionally retrograde) in step 3 of the method, an alignment will be generated of the channels 5b, 5d, 5f with the channels 5a, 5c, 5e, 5g which already contain a respective wire A: during the step of alignment of these channels (5b, 5d, 5f aligned with 5a, 5c, 5e, 5g) the openings of all the channels 5a, 5b, 5c, 5d, 5e, 5f, 5g will be facing each other and mutually proximate.

During the fourth step the terminal front of the wire B will be inserted into the respective channel 5b, 5d, 5f and this will be facilitated by the presence of wires A in the channels 5a, 5c, 5e, 5g, which will act as guides for the wires B, routing them toward the inlet of the respective channel 5b, 5d, 5f (which are also provided with upper flared regions for the routing of the respective wire B).

By virtue of the fact that the channels 5a, 5b, 5c, 5d, 5e, 5f, 5g are open on one side thereof, the wire A that is already present in the channel 5a, 5c, 5e, 5g will act as a guide element for the wire B, thus facilitating the operation to insert it.

The subsequent steps of the method occur intuitively, in that when the wires A, B are completely inserted into the respective channels 5a, 5b, 5c, 5d, 5e, 5f, 5g of the bushings 4a, 4b, 4c, 4d, 4e, 4f, 4g, the rotation (which will occur according to specific predefined laws of motion that depend on the type of inductive winding to be provided) will determine a twisting of the wires A, B corresponding to the geometric requirements of the inductive winding to be provided.

It should be noted that the wires A, B can preferably be constituted by "hairpins" or other thin conductor elements (coated with a layer of dielectric material) that are adapted to the provision of inductive windings.

Advantageously the present invention solves the above-mentioned problems, by providing a twisting assembly 1 for wires A, B of inductive windings that enables the rapid advance preparation of at least some of an inductive winding.

Conveniently, the twisting assembly 1 according to the invention can be completely automatic.

Profitably, the twisting assembly 1 according to the invention does not subject the wires A, B to excessive mechanical stresses, by virtue of the variations in height of the bushings 4a, 4b, 4c, 4d, 4e, 4f, 4g which make it possible to compensate the variations in length (in the vertical/axial direction) of the wires A, B that are induced by the twisting thereof.

Advantageously, the twisting assembly 1 according to the invention is particularly precise and assured.

Positively, the twisting assembly 1 according to the invention ensures the maximum consistency of the twisting performed, in geometric and also aesthetic terms.

Positively, the present invention defines a twisting assembly 1 for wires A, B of inductive windings that is easily and practically implemented and of low cost: such characteristics make the assembly 1 and the method for twisting according to the invention innovations that are safe in use.

The invention thus conceived is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. 102021000026312 from which this application claims priority are incorporated herein by reference.

The invention claimed is:

1. A wire-twisting assembly for wires inductive windings, comprising:
   a fixed frame;
   a carousel, rotatably supported on the fixed frame and having an axis of rotation:
   a first bushing and a second bushing, each bushing being cylindrical and extending along the axis of rotation, the first and second bushings being coaxial and arranged in contiguous relation:
   wherein the first bushing defines a plurality of first channels extending substantially parallel to the axis of rotation and defining respective first wire seats, each first wire seat being open toward the second bushing:
   where the second bushing defines a plurality of second channels extending substantially parallel to the axis of rotation and defining respective second wire seats, each second wire seat being open toward the first bushing;
   the second bushing further including a plurality of shaped portions formed on an upper surface thereof, each shaped portion defining a conveyance chute configured to guide a terminal end of at least one wire toward and into a corresponding first channel of the first bushing; and
   at least one drive element configured to rotate the first bushing and second bushing relative to one another about the axis of rotation,
   wherein relative rotation between the first and second bushings selectively aligns the shaped portions of the second bushing with the first channels of the first bushing to facilitate insertion of the terminal end of the at least one wire into the first channel.

2. The wire-twisting assembly according to claim 1, wherein the first channels and the second channels face one another upon relative rotation of the first and second bushings, such that the channels are selectively aligned.

3. The wire-twisting assembly according to claim 1, wherein each of the first channels and the second channels includes an inlet end, having flared edges configured to facilitate insertion of the terminal end of the at least one wire.

4. The wire-twisting assembly according to claim 1, wherein the at least one drive element is configured to impart both rotational and axial movement to the first and second bushings to selectively move the first and second bushings between: an inactive configuration, in which the one of the first bushing or the second bushing that is radially outermost is positioned at a different axial height relative to the other of the first bushing or the second bushing to permit accommodation of substantially straight wires in the respective channels, and a twisting configuration, in which the first and second bushings are positioned at a same height, and are substantially coplanar, such that straight wires accommodated in the first and second channels are arranged according to a geometry of a desired inductive winding.

5. The wire-twisting assembly according to claim 4, further comprising, for each of the first and second bushings, guide elements interposed between the respective bushing and the fixed frame, wherein said guiding elements are configured to permit rotation of the respective bushing about the axis of rotation and axial translation of the respective bashing along the axis of rotation, the rotation and axial translation being limited to respective predefined angular and axial ranges.

6. The wire-twisting assembly according to claim 1, wherein at least one of the shaped portions is substantially wedge-shaped and comprises a pair of opposing inclined faces that converge upward toward an apex.

7. The wire-twisting assembly according to claim 6, wherein each inclined face defines a respective chute configured to guide the terminal end of said at least one wire into a corresponding first channel of said first bushing, the corresponding first channel being open toward an edge.

8. The wire twisting assembly according to claim 7, further comprising an inner flared surface positioned to face a radially innermost first bushing; and an outer flared surface positioned to faces a radially outermost first bushing, wherein each of the inner and outer flared surfaces is configured to guide the terminal end of the at least one wire into a corresponding first channel of the respective radially innermost and outermost first bushings.

9. The wire-twisting assembly according to claim 8, wherein the inner flared surface and the outer flared surface are fixed to the fixed frame.

10. A method of twisting wires for inductive windings, comprising:
   providing a fixed frame;
   rotatably supporting a carousel on the fixed frame, the carousel having an axis of rotation;
   providing a first cylindrical bushing and a second cylindrical bushing, the first and second bushings being coaxial and arranged in contiguous relation along the axis of rotation;
   defining a plurality of first channels in the first bushing, each channel extending substantially parallel to the axis of rotation and defining a first wire seat open toward the second bushing;
   defining a plurality of second channels in the second bushing, each channel extending substantially parallel to the axis of rotation and defining a second wire seat open toward the first bushing;
   forming a plurality of shaped portions on an upper surface of the second bushing, each shaped portion defining a conveyance chute configured to guide a terminal end of at least one wire toward and into a corresponding first channel of the first bushing; and
   rotating at least one of the first bushing or the second bushing relative to the other of the first bushing or the second bushing about the axis of rotation to selectively align the shaped portions of the second bushing with the first channels of the first bushing, thereby facilitating insertion of the terminal end of the at least one wire into the first channel.

11. The method off twisting according to claim 10, wherein, simultaneously with the rotation of the bushings, said bushings are moved axially along the axis of rotation, such that an axial height of each innermost bushing is equal to or greater than an axial height of the next immediately outer bushing.

12. The method off twisting according to claim 10, wherein, in a full-twist configuration, the bushings have equal axial heights.

13. The method off twisting according to claim 10, further comprising a preliminary step of radially aligning all channels of said bushings that define said wire seats.

14. The method off twisting according to claim 10, wherein said second bushings comprise a plurality, each second bushing being contiguous with at least one respective first bushing, the first bushing being coaxial with the second bushing and arranged in either an internal configuration or an external configuration.

\* \* \* \* \*